US012639119B2

(12) United States Patent
Donthi et al.

(10) Patent No.: US 12,639,119 B2
(45) Date of Patent: May 26, 2026

(54) AUTOMATIC MACHINE LEARNING-BASED PROCESSING WITH TEMPORALLY INCONSISTENT EVENTS

(71) Applicant: Capital One Services, LLC, McLean, VA (US)

(72) Inventors: Abhay Donthi, Arlington, VA (US); Tania Cruz Morales, Washington, DC (US); Jason Zwierzynski, Arlington, VA (US); Joshua Edwards, Philadelphia, PA (US); Jennifer Kwok, Brooklyn, NY (US); Sara Rose Brodsky, New York, NY (US)

(73) Assignee: Capital One Services, LLC, McLean, VA (US)

( * ) Notice: Subject to any disclaimer, the term of this patent is extended or adjusted under 35 U.S.C. 154(b) by 908 days.

(21) Appl. No.: 17/815,142

(22) Filed: Jul. 26, 2022

(65) Prior Publication Data

US 2024/0036928 A1      Feb. 1, 2024

(51) Int. Cl.
*G06F 9/50* (2006.01)
*G06N 20/20* (2019.01)

(52) U.S. Cl.
CPC ........... *G06F 9/5033* (2013.01); *G06N 20/20* (2019.01)

(58) Field of Classification Search
CPC ........... G06F 9/5033; G06F 2209/5011; G06F 2209/5019; G06F 9/5027; G06N 20/20; G06N 20/00
See application file for complete search history.

(56) References Cited

U.S. PATENT DOCUMENTS

| | | | | |
|---|---|---|---|---|
| 2008/0172673 A1* | 7/2008 | Naik | ..................... | G06F 9/5083 |
| | | | | 718/104 |
| 2014/0180738 A1* | 6/2014 | Phillipps | ................ | G06N 20/10 |
| | | | | 705/7.38 |
| 2017/0300364 A1* | 10/2017 | Liu | ......................... | G06F 9/5027 |
| 2020/0057958 A1* | 2/2020 | Moore | ................... | G06N 5/048 |
| 2020/0257561 A1* | 8/2020 | Ortiz | ......................... | G06F 9/54 |
| 2021/0117277 A1* | 4/2021 | Shetty | .................. | G06F 9/4881 |
| 2021/0224695 A1* | 7/2021 | Stefanov | ................ | G06N 20/20 |

(Continued)

*Primary Examiner* — Pierre Vital
*Assistant Examiner* — Tuan M Nguyen
(74) *Attorney, Agent, or Firm* — Foley & Lardner LLP

(57) ABSTRACT

Embodiments described herein reduce resource insufficiency of a resource source despite inconsistent resource accumulation at the resource source. For example, a request frequency may be determined to define times at which the resource source is predicted to be sufficient despite the inconsistent accumulation or influx. In one use case, with respect to a distributed computing environment having computing resource source(s)/pool(s), a requesting system may identify a machine learning model trained to generate predictions for a resource source at which inconsistent resource accumulation occurs. The system may obtain accumulation data that describes accumulation events at which resources were made available at the resource source. Using the accumulation data with the machine learning model, the system may determine a request frequency for a request type based on predicted times at which a threshold amount of resources is available at the resource source and may request resources in accordance with the request frequency.

18 Claims, 5 Drawing Sheets

(56) References Cited

U.S. PATENT DOCUMENTS

| 2021/0232461 A1* | 7/2021 | Calmon | ............. | G06F 11/1464 |
| 2021/0279662 A1* | 9/2021 | Morgan | ................. | H04L 63/08 |
| 2022/0255814 A1* | 8/2022 | Vandikas | ............... | H04L 41/16 |

* cited by examiner

200

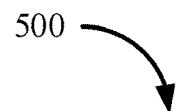

500

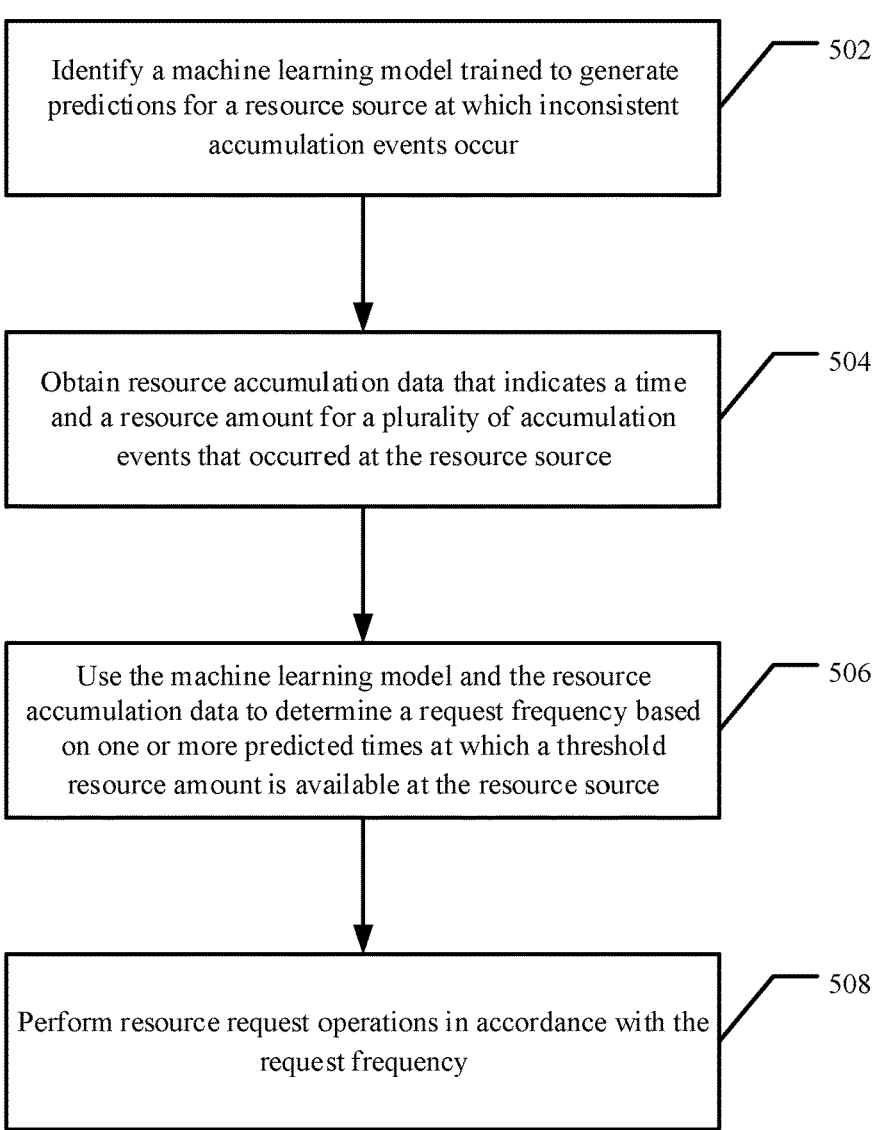

Identify a machine learning model trained to generate predictions for a resource source at which inconsistent accumulation events occur — 502

Obtain resource accumulation data that indicates a time and a resource amount for a plurality of accumulation events that occurred at the resource source — 504

Use the machine learning model and the resource accumulation data to determine a request frequency based on one or more predicted times at which a threshold resource amount is available at the resource source — 506

Perform resource request operations in accordance with the request frequency — 508

*FIG. 5*

AUTOMATIC MACHINE LEARNING-BASED PROCESSING WITH TEMPORALLY INCONSISTENT EVENTS

BACKGROUND

Inconsistent accumulation of resources at a resource source detracts from an ability of the resource source to reliably provide resources in response to requests thereof. Failure by a resource source to provide resources to a requestor for insufficiency-related reasons may lead to various technical problems including operational delays, increased remedial processing, increased costs and penalties, network bandwidth occupancy, and the like. In many cases, insufficiency issues may arise when resources are requested from the resource source in a consistent and periodic manner that is non-harmonious with inconsistent and variable influx of resources at the resource source. These and other technical challenges exist.

SUMMARY

Methods and systems are described herein for technical improvements related to reducing resource insufficiency of a resource source despite resources accumulating inconsistently and with variability at the resource source. In accordance with various embodiments described herein, technical improvements may be provided through reduction of resource insufficiency in instances in which resources are made available at a resource source in variable and inconsistent amounts, at variable and inconsistent times, or the like. In particular, aspects of the present disclosure may reduce resource insufficiency of a resource source at least in part through using machine learning models to predict accumulation behavior based on accumulation events that have occurred at the resource source and using the predicted accumulation behavior to determine ideal or optimized instances at which resources can be requested from the resource source. With the present disclosure, consequences of resource insufficiency such as operational delays, increased remedial processing, increased costs and penalties, network bandwidth occupancy, and the like may be minimized and mitigated.

As one example, methods and systems are described herein for decentralized resource management in a distributed and/or shared resource environment, where a requesting system (e.g., a tenant or client system in the distributed computing environment) may determine a frequency at which the requesting system can request resources without facing resource insufficiency of the resource source. A requesting system may identify a machine learning model configured to generate predictions for a resource source where resources may accumulate inconsistently (e.g., other tenant/client systems releasing computing resources in a non-consistent manner). Resource accumulation data that describes accumulation events at which resources were made available may be obtained and used as input to the machine learning model. In particular, the resource accumulation data may be used with the machine learning model to determine a request frequency based on predicted times at which a threshold amount of resources is available at the resource source. With the determination of the request frequency, the requesting system may perform resource request operations with the resource source in accordance with the request frequency.

In another example scenario, various embodiments may enable a requesting system to request a transfer of resources from an entity in a manner that avoids instances in which the entity cannot fulfill the request for insufficiency reasons (e.g., due to an inconsistent influx of resources to the entity). According to various embodiments, the requesting system may identify a machine learning model for generating predictions for a resource source of the entity at which accumulation events have occurred. The requesting system may obtain resource accumulation data that indicates at least a time and an amount for the accumulation events. The requesting system may then use the resource accumulation data with the first machine learning model to determine a request frequency for a request type (e.g., requests for a certain fixed amount of resources, requests for a certain type of resource, requests for transfer of resources via a certain channel), with the request frequency being based on predicted times at which a threshold amount of resources is available at the resource source (e.g., due to the accumulation events that have occurred and any subsequent, potential, or future accumulation events). The requesting system may then perform resource request operations of the request type with the resource source of the entity.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 5 shows a flowchart of an example method of reducing resource insufficiencies despite inconsistent resource accumulation, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
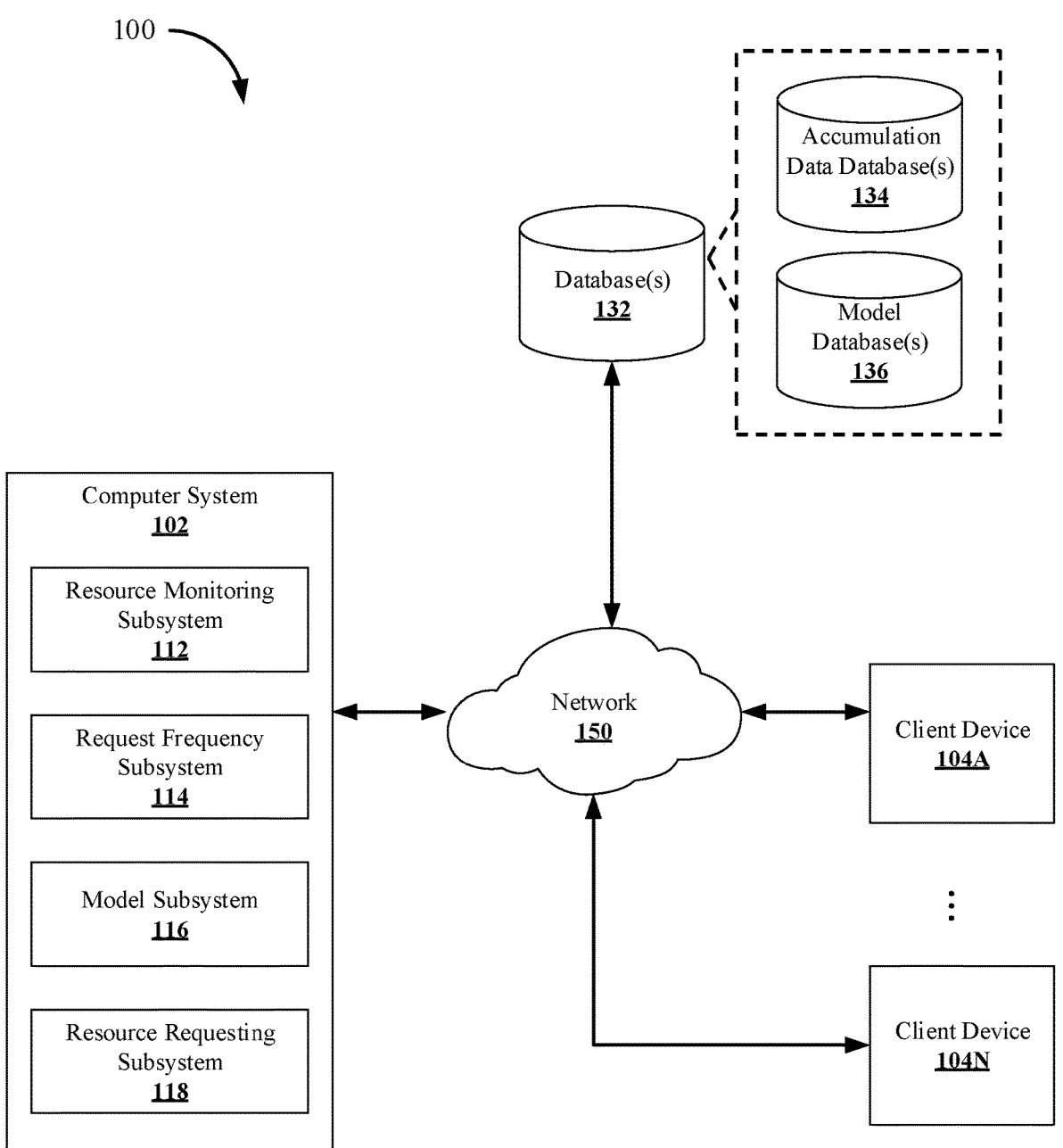
FIG. 1 shows an example system for reducing resource insufficiency of a resource source, in accordance with one or more embodiments.

FIG. 1 shows an example of a system 100 for reducing resource insufficiency of a resource source, in accordance with one or more embodiments. As shown in FIG. 1, the system 100 may include computer system 102 that may embody a requesting system (e.g., a system that requests resources from a resource source), one or more client devices 104 (e.g., 104A-104N), or other components. The computer system 102 may include a resource monitoring subsystem 112, a request frequency subsystem 114, a model subsystem 116, a resource requesting subsystem 118 or other components. The one or more client devices 104A-104N may include other systems that operate within the system 100 or environment, systems or devices that are associated with entities from which the computer system 102 may request resources (e.g., a mobile terminal, a fixed terminal), one or more resource source systems (e.g., systems that accumulate resources and that manage accumulated resources), or other devices. By way of example, a client device 104 (e.g., one of client devices 104A-104N) may include a desktop computer, a server, a notebook computer, a tablet computer, a smartphone, a wearable device, or other client device. Entities or users may, for instance, utilize one or more client devices 104 to interact with one another, one or more servers, or other components of system 100. It should be noted that, while one or more operations may be described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of a client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, the system 100 may identify a machine learning model configured for generating predictions for a resource source at which resources accumulate inconsistently. In some embodiments, the system 100 identifies a particular machine learning model over other machine learning models to generate predictions specific to the resource source. The system 100 may then obtain accumulation data that describes at least the time and amount of a plurality of accumulation events at which resources were made available at the resource source. As an example, at the accumulation events, resources may accumulate at the resource source in variable amounts with variable time spanning between each accumulation event, thus defining an inconsistency.

In some embodiments, a resource source may include an entity, a construct, or the like, to which resources may belong and at which a variable amount of resources may be available. For example, a resource source may be embodied by a shared computing resource pool in a cloud and/or distributed computing environment, and the shared computing resource pool may include computing resources that may be available to tenant systems in the environment. The amount of computing resources available at the shared computing resource pool may be inconsistent according to resource usage of the various tenant systems.

In some embodiments, the system 100 uses the accumulation data that describes accumulation events (e.g., release of computing resources, influx of asset resources, etc.) as input to the machine learning model and determines one or more request frequencies. Each request frequency may be associated with a request type, which may define various aspects of resource requests such as a requested amount of resources, a requested type of resources, a requesting entity or system, an intended use of the requested resources, or the like. As one example, the system 100 may determine a first request frequency for resource requests for an amount greater than a resource amount threshold, a second request frequency for resource requests for an amount less than the resource amount threshold, one or more other request frequencies for resource requests for amounts respectively greater than or less than one or more other resource amount thresholds or between such other thresholds, or other request frequencies. As another example, the system 100 may determine a first request frequency for resource requests originating from a first requesting entity, a second request frequency for resource requests originating from a second requesting entity, one or more other request frequencies for resource requests originating from one or more other requesting entities, or other request frequencies. In some examples, a request type may be associated with a previous request frequency, which may be automatically adjusted to a new frequency determined by the system 100, and the system 100 may dynamically update a request frequency based on additional/new accumulation data (e.g., by automatically obtaining updated predictions from the machine learning model's processing of the additional/new accumulation data on a periodic or continuous basis). In some embodiments, the request frequency determined by the system 100 may be configured to envelop or contain, at least to a degree, the inconsistent accumulation behavior.

Thus, with the intelligent determination of request frequencies that envelop and contain inconsistent accumulation behavior, one or more resource request operations for a given request type may be performed in accordance with the request frequency associated therewith to reduce a likelihood that the resource source has insufficient resources to fulfill the request. Such a reduction of resource insufficiency overcomes various technical challenges. For example, a likelihood that a requestor must wait for the requested amount of resources to accumulate after failure of the resource source to complete the request may be reduced, thus promoting operational efficiency. As another example, a need for remedial processing (e.g., identifying and requesting a second resource source when the first resource source is insufficient) is reduced. As yet another example, load and activity on a network, such as the network 150 illustrated in FIG. 1, may be reduced, as multiple requestors for a resource source may request resources at optimized frequencies, and back-and-forth communications for insufficiency error handling are precluded. These and other technical improvements may be enjoyed through various embodiments described herein.

Figure 2:
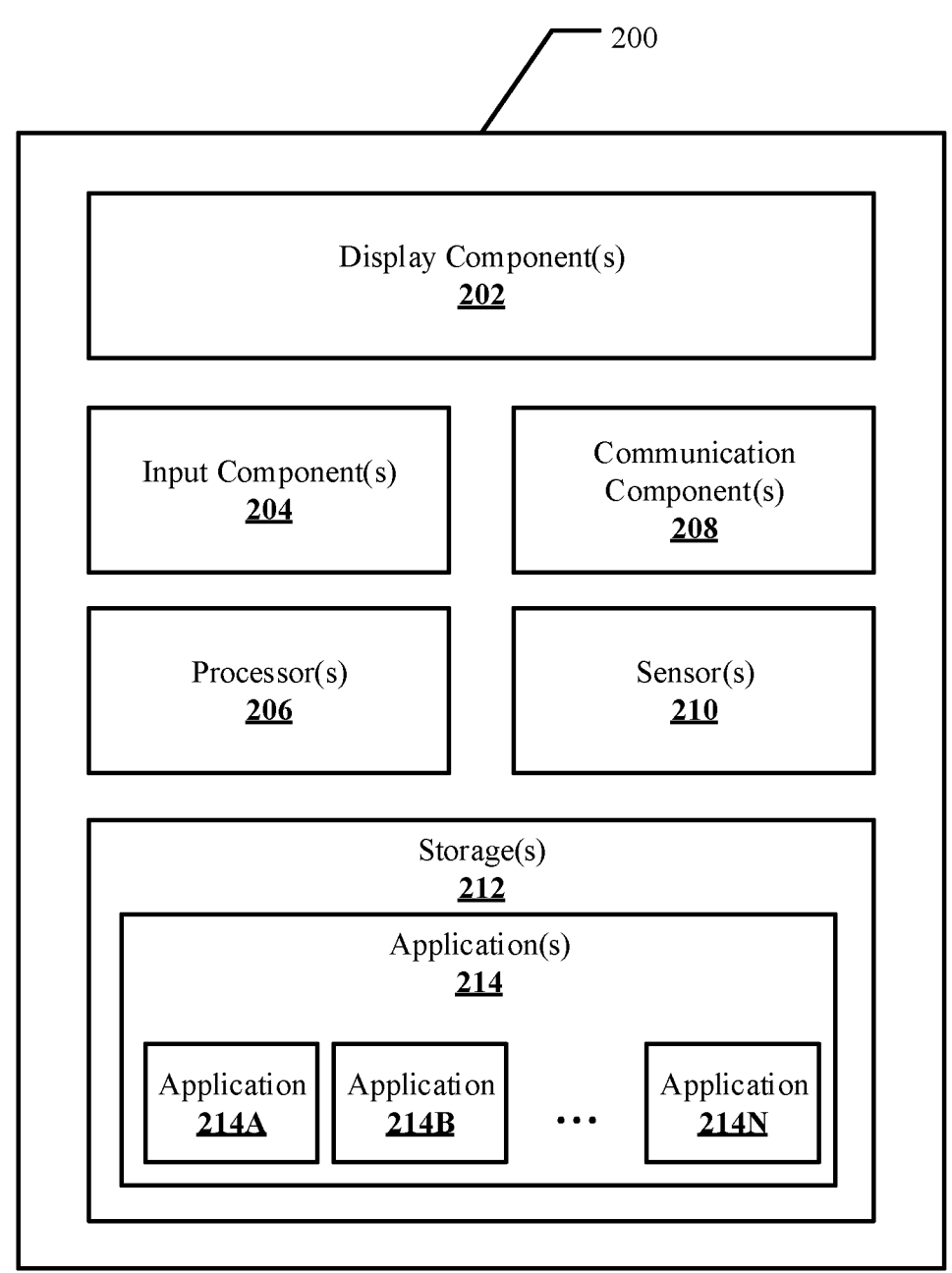
FIG. 2 shows an example computing entity for performing operations to reduce resource insufficiencies despite inconsistent resource accumulation, in accordance with one or more embodiments.

In some embodiments, with respect to FIG. 2, one or more operations described herein that relate to reducing resource insufficiency of a resource source despite inconsistent resource accumulation may be performed by a computing entity 200. In some embodiments, the computing entity 200 may embody the computing system 102 or components thereof (e.g., subsystems 112-118). As illustrated, the computing entity 200 may include a plurality of components, such as display component(s) 202, input component(s) 204, processor(s) 206, communication component(s) 208, sensor (s) 210, storage(s) 212, application(s) 214, or other compo-
nents. In some embodiments, storage 212 may store a
variety of applications 214. For example, applications 214A-
214N may represent different applications stored on com-
puting entity 200, and an application 214 may correspond to
the performance of various example operations herein. As
another example, application 214 may be an application that
is configured as a web browser for interacting with one or
more entities over network 150. For example, an application
214 may be configured to determine a request frequency for
a resource request type, and another application 214 may be
configured to perform request operations in accordance with
the determined request frequency. In various embodiments,
communication components 208 may be configured for
receiving accumulation data, communicating with a
resource source, or the like, for example.

Subsystems 112-118

In some embodiments, a resource monitoring subsystem
112 of the computer system 102 may be configured to obtain
accumulation data for a resource source, for example to
monitor the accumulation of resources at the resource
source. The accumulation data may specifically include data
describing each of a plurality of accumulation events that
have occurred at a resource source. In some embodiments,
the resource monitoring subsystem 112 may configure a
monitoring window that defines a time period for which the
resource monitoring subsystem 112 may obtain accumula-
tion data. For example, the resource monitoring subsystem
112 may configure a monitoring window of a month, a year,
or other time period so that the resource monitoring sub-
system 112 obtains accumulation data for accumulation
events that have occurred within such time period. In some
embodiments, the resource monitoring subsystem 112 may
be configured to monitor a plurality of resource sources, and
the resource monitoring subsystem 112 may configure a
monitoring window for each resource source.

Figure 3:
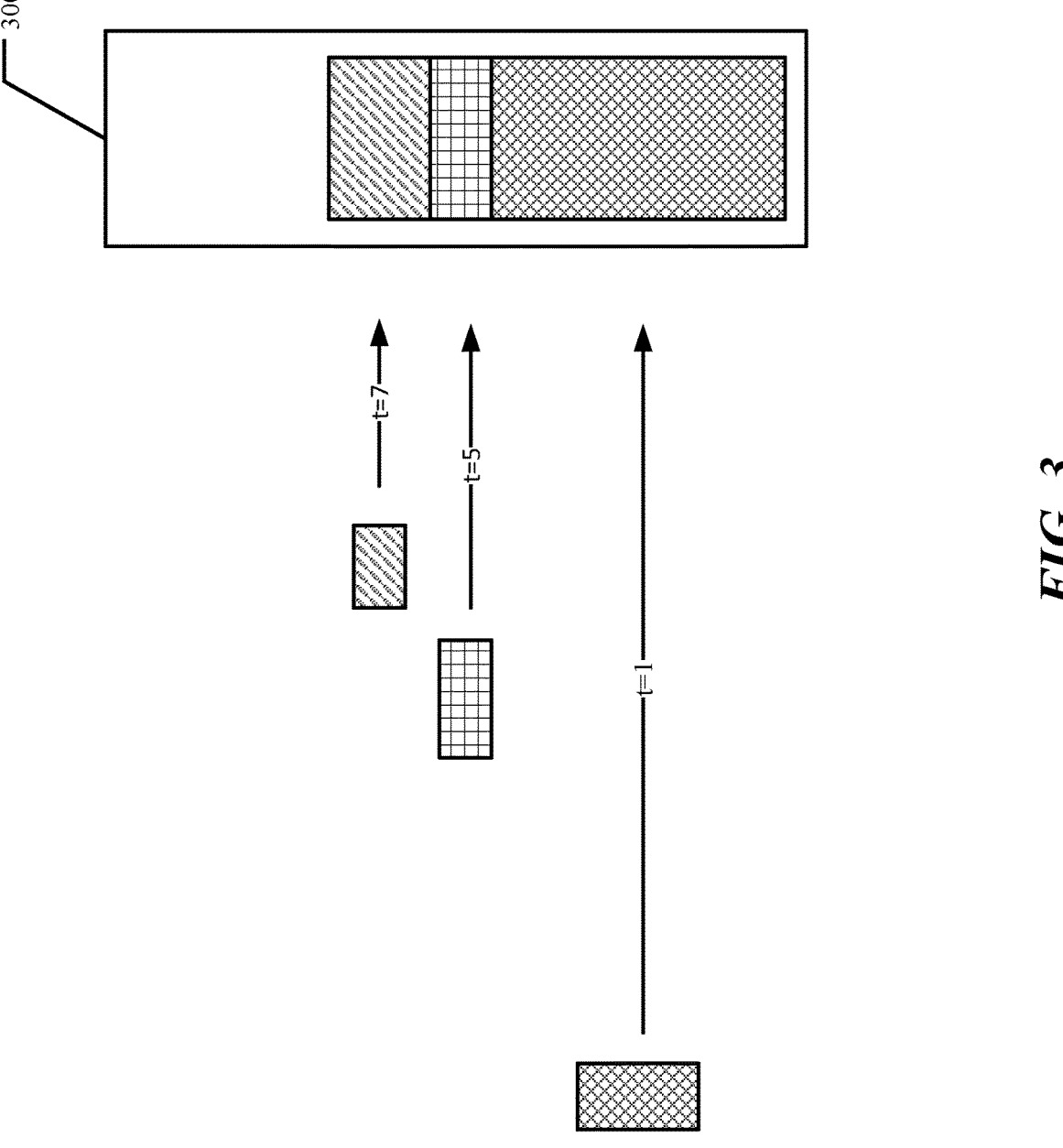
FIG. 3 provides a diagram showing inconsistent accumulation events at which resources are made available at a resource source, in accordance with one or more embodiments.

As discussed, the resource monitoring subsystem 112 may
obtain accumulation data that describes a plurality of accu-
mulation events at which resources were made available at
a resource source. In example scenarios, the accumulation
events may be inconsistent with respect to one or more
aspects, and such inconsistencies may be described within
the accumulation data. Referring to FIG. 3, an example of
inconsistent accumulation events for a resource source 300
is shown. Specifically, FIG. 3 illustrates three inconsistent
accumulation events at which resources are made available
at (e.g., deposited at, returned to, released to, received by, or
the like) the resource source 300. As shown, the three
accumulation events are inconsistent with respect to an
amount of resources made available at each event and
further with respect to a spanned time between the accumu-
lation events. In some examples, accumulation events may
also be inconsistent with respect to a type of resources being
made available, an origin of the resources (e.g., a system at
which the resources were previously in use, an entity pre-
viously in possession of the resources), and/or the like.
Accordingly, the accumulation data obtained by the resource
monitoring subsystem 112 may indicate various such
aspects of each accumulation event, including at least the
time at which the event occurred and an amount of resources
made available at the event.

In some embodiments, the resource monitoring subsystem
112 may obtain the accumulation data based on communi-
cating with and receiving data from other components,
devices, and systems in the system 100. In one example
embodiment, the resource monitoring subsystem 112 obtains
the accumulation data based on receiving data from a client device 104 that may manage, analyze, host, or perform a
similar function for the resource source. For example, the
client device 104 may include a resource manager, or the
client device 104 may be the resource source itself. In one
example, the client device 104 may be associated with an
entity to whom asset resources in the resource source belong
or an entity responsible for managing the asset resources in
the resource, and the client device 104 may transmit data
including statements, receipts, forms, or the like, to the
resource monitoring subsystem 112 that describe the pos-
session and accumulation of the asset resources in the
resource source.

In some examples, the resource monitoring subsystem
112 may obtain the accumulation data from one or more
client devices 104, systems, or entities that may have caused
the accumulation events to occur. For example, resources
made available at an accumulation event may originate from
such client devices 104, systems, entities, or the like. In the
asset resource context, an accumulation event may involve
an entity depositing asset resources at the resource source,
and the resource monitoring subsystem 112 may obtain the
accumulation data based on receiving data from such entities
that describes the depositing of asset resources. In the cloud
and/or distributed computing context, the resource monitor-
ing subsystem 112 may receive data from tenant systems
previously occupying resources before releasing the
resources at an accumulation event. Thus, for example, the
resource monitoring subsystem 112 may obtain accumula-
tion data based on receiving data from receiving entities,
from originating entities, or both.

In some embodiments, the resource monitoring subsystem
112 may receive data from which accumulation data may be
obtained from a client device 104 of system 100 via first
transmitting a request that may indicate the monitoring time
window to the client device 104. For example, the resource
monitoring subsystem 112 may obtain the accumulation data
from the client device 104 via a call or query to an
application programming interface (API) and via an API
response including data from which the accumulation data
may be obtained.

In some embodiments, the resource monitoring subsystem
112 may obtain the accumulation data based on the resource
source being integrated and/or accessible by the resource
monitoring subsystem 112 or the computing system 102. For
example, the computing system 102 may itself comprise the
resource source or embody the resource source, such that the
accumulation data may be inherently or internally obtained.

In some examples, the resource monitoring subsystem
112 may obtain more general data from which accumulation
data is extracted. For example, the resource monitoring
subsystem 112 may first obtain data describing both accu-
mulation events (in which an amount of available resources
increase) and reduction events (in which an amount of
available resources decrease), and the resource monitoring
subsystem 112 may identify and extract the accumulation-
specific data. In some embodiments, the resource monitoring
subsystem 112 extracts accumulation data using an extrac-
tion machine learning model. For example, the resource
monitoring subsystem 112 may extract accumulation data
from text-based data using an extraction machine learning
model configured for performing optical character recogni-
tion or for performing natural language processing. In one
use case, an extraction machine learning model may be
trained to recognize data (e.g., text data) indicative of an
accumulation or increase of available resources at a resource
source, and the extraction machine learning model may be trained to extract data specific to such an accumulation event, including a time, an amount, or the like, from the data.

In some embodiments, the resource monitoring subsystem 112 may retrieve accumulation data from the accumulation data database 134 (shown in FIG. 1), which stores the accumulation data. For example, in some embodiments, the resource source may be configured to generate and store data describing accumulation events in the accumulation data database 134 where the data may be retrieved by various components of the system 100, including the resource monitoring subsystem 112. In some embodiments, the resource monitoring subsystem 112 may store accumulation data in the accumulation data database 134, such that other subsystems, systems, devices, entities, or the like, may access and use the obtained accumulation data. For instance, a model subsystem 116 may use accumulation data stored in the accumulation data database 134 to train one or more machine learning models to generate predictions related to accumulation behavior of a resource source.

In any regard, the resource monitoring subsystem 112 obtains accumulation data describing a plurality of accumulation events at a resource source, such as those shown in FIG. 3, and the accumulation data may be used to detect inconsistencies in the accumulation events. In some embodiments, the accumulation events described by the obtained accumulation data include events at which resources accumulate in, are deposited into, are rendered available, are delivered at, are generated at, or are released at a resource source, and the accumulation events described by the accumulation data may be inconsistent with one another at least with respect to a time spanning between each event or a resource amount of each event. For example, in one illustrative use case, the resource monitoring subsystem 112 may obtain accumulation data for a shared computing resource source/pool, the accumulation data describing accumulation events in which tenant systems of a cloud and/or distributed computing environment release different amount of computing resources (e.g., processors/processing cores, processing bandwidth, volatile memory, non-volatile memory, transmission bandwidth, etc.) upon completion of respective tenant operations at different points in time, thereby defining inconsistency in computing resource accumulation at the shared computing resource source/pool. As another example, in another illustrative use case, the resource monitoring subsystem 112 may obtain accumulation data for an asset account for a customer or user, and the accumulation data may describe accumulation events for the asset account; such accumulation events may involve asset resources (e.g., fiat currency, physical assets or commodities, digital assets, etc.) being deposited in inconsistent amounts with inconsistent times spanning between each event. For example, the customer or user may experience inconsistent income or influx of asset resources due to on-demand, contract-based, or gig-based earning of the asset resources.

The accumulation data obtained by the resource monitoring subsystem 112 may be used by the request frequency subsystem 114 to determine ideal or optimized request frequencies to account for resource insufficiencies, or to determine times at which resources can be requested from the resource source without insufficiency being expected.

In some embodiments, the request frequency subsystem 114 may be configured to determine a request frequency for a request type based on using the accumulation data obtained by the resource monitoring subsystem 112 with a machine learning model configured to generate predictions for the resource source. According to various embodiments, the request frequency subsystem 114 identifies a machine learning model to use for generating predictions for the resource source. For example, the machine learning model identified by the request frequency subsystem 114 may be associated with the resource source. As another example, the machine learning model may be identified based on being associated with another resource source that is similar with the resource source. In the asset resource context, a machine learning model may be identified and used for resource sources having asset resources belonging to entities having similar demographics, similar historical usage of the asset resources, or the like. A machine learning model may be identified for the resource source based on determining that the resource source is similar to one or more other resource sources associated with the machine learning model.

The accumulation data may be provided as an input to the identified machine learning model. As discussed, the accumulation data may indicate one or more aspects or dimensions related to a plurality of accumulation events, such as a time, an amount, an originating entity or system, a resource type, and/or the like, and the one or more aspects of the plurality of accumulation events may be configured as inputs to the identified machine learning model. For example, the time of each accumulation event may be provided as input to the machine learning model so that the machine learning model may generate predictive or extrapolative outputs at least with respect to the timing of succeeding accumulation events. As another example, a resource amount for each accumulation event may be provided as input to the machine learning model so that the machine learning model may generate predictive or extrapolative outputs at least with respect to the resource amount of succeeding accumulation events.

Further, in some embodiments, an indication of the originating entity or system (e.g., the entity or system previously in possession of the resources made available at an accumulation event, the entity or system causing the accumulation event) may be provided for the machine learning model, which may in turn generate an output based on identifying, classifying, processing, or the like, the indication of the originating entity or system. In a computing resource use case, for example, originating entities or systems may be classified according to their wealth of computing resources, or an excess amount of computing resources with respect to their operation. For example, an excess amount of computing resources being occupied or used by a tenant system may be indicated to the machine learning model, which may generate a predictive output that the tenant system is likely to imminently release the excess amount of computing resources, or is likely to release an amount of computing resources within a predicted amount of time. Similarly, in some examples, originating entities or systems may be classified according to their use or application of the computing resources; the machine learning model may generate a classification output for an originating system based on a resource-intensiveness of the computing operations or tasks being performed by the originating system, based on a stage or progress of the computing operations/tasks being performed by the originating system.

In an asset resource use case, for example, the machine learning model may be trained to generate an output based on characteristics related to the originating entity. For example, the machine learning model may recognize, determine, or predict (e.g., via one or more hidden states or representations in hidden layers of the machine learning model) a reliability of the originating entity with respect to succeeding accumulation events. A certain originating entity may be determined to be more reliable, such as due to a relative wealth of asset resources compared to another originating entity, in depositing asset resources in the resource source. In some examples, inconsistency in accumulation events may be due to cancellations of accumulation events by an originating entity, and the machine learning model may be trained to, based on historical data indicating prior cancellations of accumulation events, determine the reliability of the originating entity. With the above, a machine learning model may determine a reliability measure or score (e.g., a predicted likelihood of cancellation of a succeeding accumulation event), a reliability classification (e.g., resource wealth categories or tiers), or the like, for an originating entity (e.g., represented via or included in a hidden state or representation of a hidden layer, included in an output of the machine learning model), in some embodiments. Thus, in some embodiments, an indication of originating entities and/or characteristics thereof for the plurality of accumulation events may be provided to the machine learning model as input.

In some embodiments, the machine learning model may be configured to provide an output used to determine a request frequency for a resource request. In some embodiments, the machine learning model is configured to output one or more predicted times and/or predicted amounts of one or more accumulation events succeeding the plurality of accumulation events indicated in the accumulation data. As another example, the machine learning model may be configured to predict a time at which a threshold amount of resources is accumulated and available at the resource source based on the plurality of accumulation events indicated by the accumulation data. The machine learning model may predict the time at which the threshold amount of resources is accumulated and available further based on a plurality of predicted accumulation events.

In some embodiments, the machine learning model may be configured to generate a predicted likelihood that another accumulation event will occur before a target point in time. As another example, the machine learning model may be configured to generate a predicted likelihood that an accumulation event of at least a threshold resource amount will occur before a target point in time. As yet another example, the machine learning model may be configured to generate a predicted likelihood that a threshold amount of resources will be accumulated by a specific target point in time.

At least these predicted outputs or subsets thereof of the machine learning model may be used to determine a request frequency that envelops or contains, at least to a degree, the inconsistencies of resource accumulation at the resource source or a request frequency that defines one or more times at which it is expected that resources may be requested without insufficiency at the resource source. For example, based on a prediction that accumulation of a threshold amount of resources requires a predicted amount of time, a request frequency having a period longer than the predicted amount of time may be determined. The request frequency may be determined via determining a period that is greater than the predicted amount of time by a predetermined margin. As another example, based on a prediction that a succeeding accumulation event will occur anywhere between two to three hours from a present point in time, a request frequency having a period longer than three hours (e.g., by at least a predetermined margin) may be determined to safely account for inconsistency and variation in timing of the succeeding accumulation event.

In some embodiments, the machine learning model may be configured and trained to generate an output that includes the request frequency. For example, based on a first accumulation event for a small resource amount and a second accumulation event for a large resource amount occurring on a regular interval (e.g., as indicated by the accumulation data input to the machine learning model), the machine learning model may output a request frequency having a period of at least the regular interval for requests for resource amounts greater than the small resource amount.

In some embodiments, the request frequency subsystem 114 is configured to determine and dynamically update a request frequency (e.g., using the machine learning model) for each of a plurality of request types. As described, the plurality of request types may define resource requests of different amounts (e.g., requests for a resource amount over a threshold amount, requests for a resource amount less than the threshold amount), requests for different types of resources, requests received from different entities, requests for resources via different resource transfer modalities (e.g., transfer of asset resources via automated clearing house, via cash, via credit payment), or the like.

For dynamic updating of a request frequency for a resource request or for resource requests of a resource type, new accumulation data that includes succeeding accumulation events may be repeatedly obtained (e.g., by the resource monitoring subsystem 112) and provided as input to the machine learning model to determine an updated request frequency. Determination of an updated request frequency may occur at a configurable frequency, may occur in response to an accumulation event or in response to obtaining accumulation data describing a new accumulation event, may occur after a response request is transmitted to the resource source, may occur in response to a user input (e.g., via input component(s) 204 of a computing entity 200), or the like.

As described, machine learning models are used in various embodiments to reduce resource insufficiency despite inconsistent resource accumulation, and in some embodiments, model subsystem 116 may train or configure one or more machine learning models or other prediction models, including the machine learning model identified by the request frequency subsystem 114, to facilitate one or more embodiments described herein. In some embodiments, such models may be used to perform time-based predictions, amount-based predictions, probability or likelihood predictions/outputs, or the like. As an example, such models may be trained or configured to perform the foregoing functions and operations by respectively mutually mapping input data and output data in nonlinear relationships based on learning (e.g., deep learning).

In some embodiments, the machine learning or prediction models described herein are configured to receive input data that includes the obtained resource accumulation data for a resource source, or accumulation data that indicate aspects of a plurality of accumulation events that occurred at the resource source, for example. Accordingly, an example machine learning model or prediction model may be configured to receive multiple dimensions of accumulation data that may include a resource amount of the plurality of accumulation events, a time associated with the plurality of accumulation events, an indication or identification of an originating entity or system of the plurality of accumulation events, or the like. In a computing resource use case, for example, an example machine learning model or a prediction model may be configured to receive as input a multi-dimensional array, vector, or matrix that indicates a resource type (e.g., processing cores, memory space, transmission bandwidth, etc.), a resource amount, a time, and an originating tenant system for a plurality of accumulation events.

In an asset resource use case, for example, an example machine learning model or a prediction model may be configured to receive as input an asset resource amount (e.g., amount of asset resources deposited), a resource time (e.g., when asset resources were deposited), and an originating entity (e.g., the entity that deposited the asset resources) for each of the plurality of accumulation events.

As discussed herein, identification of an originating entity or system or data describing characteristics of an originating entity or system may be provided as input data to a machine learning model, such that aspects of the originating entity or system may be factored into predictive outputs generated by the machine learning model. In some embodiments, an originating entity or system may be identified by a unique identifier or token, for example, a token assigned to tenant systems of a cloud and/or distributed computing environment or an account number from which asset resources are transferred into the target asset account (the resource source). An originating entity that deposits asset resources into the asset account (e.g., a company from which the associated user earns income) may be identified to the machine learning model based on a universal alphanumeric code, a text or character string that indicates a name of the originating entity, a link or address (e.g., an on-chain address for a blockchain), or the like.

In some embodiments, delta values may be determined and provided to the machine learning or prediction models. For example, the time spanning between pairs of accumulation events or a difference in resource amounts between pairs of accumulation events may be provided as input to a machine learning or prediction model. As an example, times spanning between pairs of accumulation events at which computing resources were released at the resource source or at which asset resources were deposited into the resource source may be determined and provided as input to the machine learning or prediction models.

In some embodiments, an average time between pairs of accumulation events and a deviation or variation measure from the average time may be determined and provided to the machine learning or prediction models as input that directly indicates the inconsistent nature of the accumulation events, for example. Alternatively, or additionally, an average resource amount of the plurality of accumulation events and a deviation or variation measure from the average resource amount across the plurality of accumulation events may be determined and provided to the machine learning or prediction models as input that directly indicates the inconsistent nature of the accumulation events. For example, it may be determined that asset resources are deposited by an originating entity into an asset account every four weeks on average with a deviation (plus or minus) of 10 days, and these determined values may be provided as input to a machine learning model. As another example, it may be determined that an average of two gigabytes of non-volatile memory storage is released by a tenant system of a cloud and/or distributed computing environment with a deviation of 500 megabytes, and these values are provided as input to a machine learning model. In some embodiments, such average values and deviation/variation measures are determined using the accumulation data for the resource source.

With the provided input data in accordance with various embodiments described herein, the machine learning or prediction models are configured to generate predictive outputs to determine request frequencies for resource requests. In some embodiments, a machine learning model may generate an output that includes a prediction about the next accumulation event following the plurality of accumulation events described by the accumulation data and described in the provided input data. For example, a machine learning model may generate an output that predicts that a tenant system will release an amount of processing bandwidth at a predicted point in time based on the provided input data. As another example, a machine learning model may generate an output that predicts that an originating entity that was described in the input data will deposit a predicted amount of asset resources into the resource source at the next accumulation event. In some embodiments, the machine learning model generates a predictive output with respect to a time for each of one or more succeeding accumulation events, a resource amount for each of the one or more succeeding accumulation events, or both. For example, a model may generate an output that includes a prediction that the next accumulation event will occur within a predicted range of times (e.g., between three or five days from a present day) and will involve a deposit of a predicted resource amount or a predicted range thereof (e.g., between three hundred to six hundred dollars). In some embodiments, the output of the machine learning model may include a prediction with respect to the originating entity for one or more succeeding accumulation events.

In some embodiments, the number of succeeding accumulation events (accumulation events predicted to occur in the future after the occurrence of a plurality of accumulation events described in the accumulation data) may be predetermined and/or configurable, and may be understood as a prediction window or horizon. In some embodiments, the prediction window or horizon may be based on a threshold prediction accuracy, as longer prediction windows may be associated with reduced prediction accuracy; thus, based on a high threshold prediction accuracy, the prediction window or horizon may be smaller, for example. Input data may be provided to different machine learning models that are configured with different prediction windows or horizons in order to obtain multiple and potentially different predictive outputs.

In some embodiments, a machine learning or predictive model may directly output a predicted or optimized request frequency for a resource request based on the provided input data. For example, with input data indicating that an originating entity deposits asset resources in the asset account at an average of every five weeks with a deviation of two weeks, the machine learning or predictive model may generate an output that indicates a request frequency of seven weeks. As another example, with input data indicating that an originating entity deposits an average amount of five hundred dollars with a deviation of two hundred dollars every three weeks, the machine learning or predictive model may generate an output that indicates a request frequency of six weeks for requests of over six hundred dollars. In some embodiments, a machine learning or predictive model may be configured to generate outputs for a plurality of request types; in the foregoing example, a machine learning or predictive model may generate an output that indicates a first request frequency of six weeks for requests of over six hundred dollars, a second request frequency of nine weeks for requests of over twelve hundred dollars, and a third request of three weeks for requests of under three hundred dollars.

In some embodiments, the machine learning or prediction models described herein may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem-solving as compared to traditional computer programs. In some embodiments, neural networks may include multiple layers (e.g., where a signal path traverses from front layers to back layers). In some embodiments, backpropagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

In some embodiments, data defining neural units and parameters thereof (e.g., weights, biases, hyperparameters) as well as data defining an architecture of a machine learning model (e.g., specific connections or edges between specific neural units, configuration of different layers) may be stored in one or more model databases 136. Training of a model that is defined in a model database 136 may comprise modifying one or more parameters stored within the model database 136.

Figure 4:
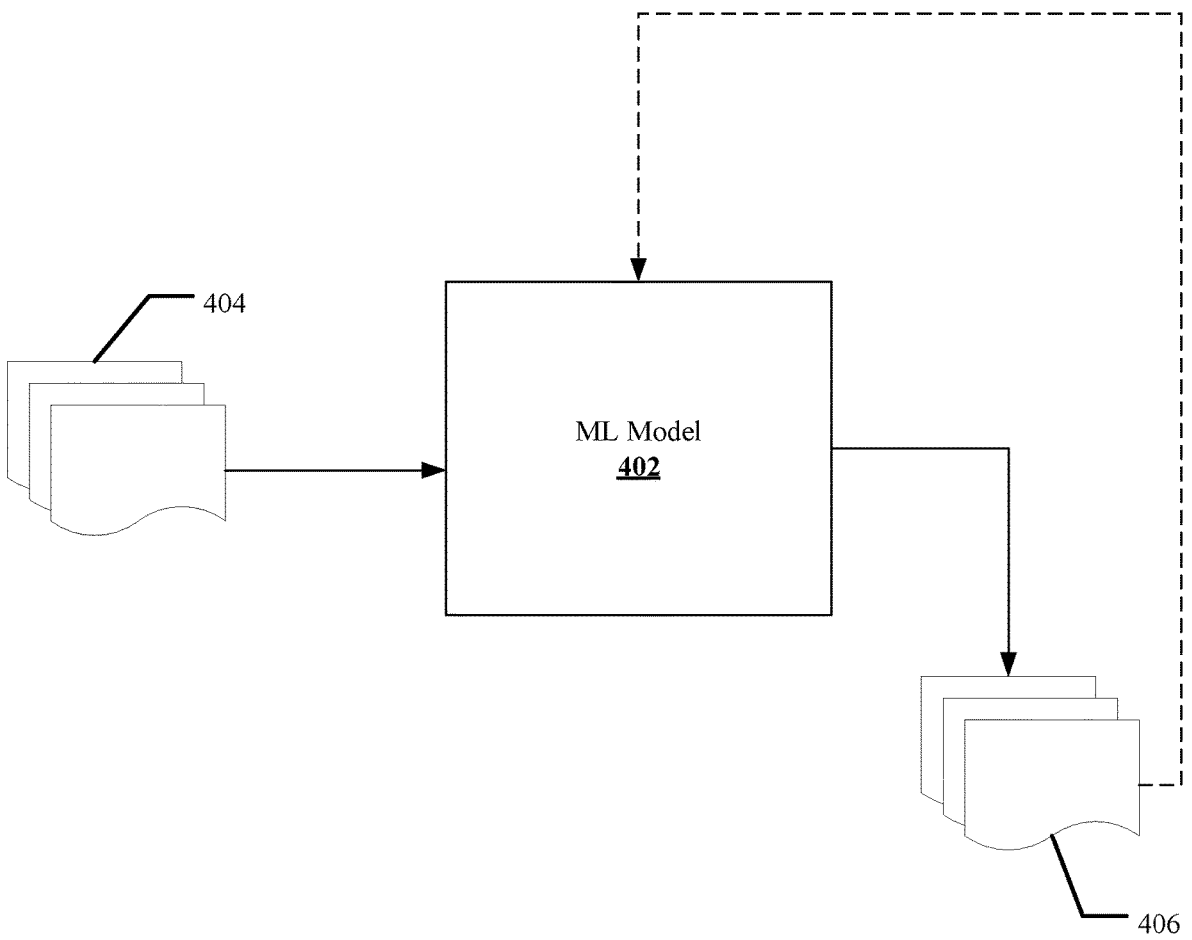
FIG. 4 shows an example machine learning model configured to generate predictions for a resource source to reduce resource insufficiencies despite inconsistent resource accumulation, in accordance with one or more embodiments.

With respect to FIG. 4, an example machine learning model 402 may take inputs 404 and provide outputs 406. In one use case, outputs 406 may be fed back to machine learning model 402 as input to train machine learning model 402 (e.g., alone or in conjunction with user indications of the accuracy of outputs 406, with labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights may be adjusted to reconcile differences between the neural network's prediction and the reference feedback. In a further use case, one or more neurons (or nodes) of the neural network may require that their respective errors be sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may be input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bidirectional structure, forward and backward connections may be provided. The links are also referred to as connections or connection weights, as referring to the hardware-implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

In some embodiments, a machine learning model identified for a resource source may be trained on prior accumulation data for a plurality of resource sources to generate predictions for the resource source. In some embodiments, the plurality of resource sources whose prior accumulation data is used to train a machine learning model for the resource source does not include the resource source itself. Thus, for example, a machine learning model for a resource source may be trained using accumulation data for other resource sources, which may reduce overfitting-related problems and improve the accuracy of the predictions made by the machine learning model for the resource source.

With the resource requesting subsystem 118, resource request operations may be performed in accordance with the request frequencies determined by the request frequency subsystem 114. A request frequency may define one or more times at which the resource source is expected to not be insufficient, and thus, resource request operations may be performed with an increased predicted likelihood of success.

In some embodiments, the resource request operations may include generating a resource request that may indicate a requested amount of resources, a resource type, an entity or system requesting the resources, or the like, and transmitting the resource request (e.g., via the network 150) to the resource source. In the asset resource context, the resource request may be embodied by a payment request (e.g., a credit card bill, a phone bill, etc.) that is transmitted to the resource source and/or to an entity possessing the asset resources in the resource source. As such, the resource requesting subsystem 118 may be configured to perform resource request operations at least by transmitting (e.g., via the network 150) requests or other data to other components within the system 100.

In some embodiments, the resource request operations may include causing an amount of resources at the resource source to become unavailable. For example, an amount of computing resources may be automatically allocated by the resource source for a tenant system as a result of the tenant system performing the resource request operations. As another example, an amount of asset resources may be automatically withdrawn from the resource source through performing the resource request operations.

In some embodiments, resource request operations may continue to be performed according to the request frequency, and in some embodiments, the request frequency may be dynamically updated. In some embodiments, resource request operations for different request types may be performed according to their associated request frequency, and the request frequencies associated with the different request types may be dynamically updated.

Example Flowchart

FIG. 5 is an example flowchart of processing operations of a method 500 that enable the various features and functionality of the system as described in detail above. The processing operations of the method presented below are intended to be illustrative and non-limiting. In some embodiments, for example, the method may be accomplished with one or more additional operations not described and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In an operation 502, a machine learning model may be identified. The machine learning model is configured or trained to generate predictions for a resource source at which inconsistent accumulation events occur. As an example, the predictions generated by the machine learning model may relate to accumulation behavior occurring at the resource source following accumulation events that have occurred at the resource source. Operation 502 may be performed by a subsystem that is the same as or similar to the request frequency subsystem 114, in accordance with one or more embodiments.

In an operation 504, resource accumulation data may be obtained. The resource accumulation data may indicate a plurality of accumulation events that have occurred at the resource source. For example, the resource accumulation data may indicate a time and a resource amount for each of the plurality of accumulation events. In some embodiments, the resource accumulation data may specify a plurality of accumulation events within a monitoring time window; for example, obtaining the resource accumulation data may comprise configuring and/or identifying a monitoring time window. According to various embodiments, the resource accumulation data may be obtained in any number of ways, such as, but not limited to, from the resource source itself, from an entity associated with (e.g., owning resources within) the resource source, from a client device or other system that may be responsible for causing an accumulation event at the resource source, etc. Operation 504 may be performed by a subsystem that is the same as or similar to resource monitoring subsystem 112, in accordance with one or more embodiments.

In an operation 506, a request frequency for a resource request may be determined by using the machine learning model and the resource accumulation data. The request frequency may be determined based on predicted times at which a threshold resource amount is available at the resource source. In another example, the request frequency may be determined based on predicted accumulation events, or predicted times and/or predicted amounts thereof. In another example, the request frequency may be an output by the machine learning model based on providing the resource accumulation data to the machine learning model as input. As such, for example, the request frequency may envelop or contain detected inconsistency in the accumulation events that have occurred, or the request frequency may define one or more times at which a resource request may be performed without resource insufficiency at the resource source being expected or predicted. Operation 506 may be performed by a subsystem that is the same as or similar to request frequency subsystem 114, in accordance with one or more embodiments.

In an operation 508, resource request operations may be performed in accordance with the request frequency. As an example, the resource operations may be performed at one or more times defined by the request frequency. In some embodiments, the resource request operations may include causing resources at the resource source to be made unavailable. For example, the resource request operations may include withdrawing resources from the resource source, receiving resources from the resource source, having resources allocated by the resource source, or the like. In some embodiments, the resource request operations may include generating a resource request indicating a requested amount of resources and transmitting the resource request to an entity associated with ownership of the resources in the resource source. Operation 508 may be performed by a subsystem that is the same as or similar to resource requesting subsystem 118, in accordance with one or more embodiments.

In some embodiments, the various computers and subsystems illustrated in FIG. 1 may include one or more computing devices that are programmed to perform the functions described herein. The computing devices may include one or more electronic storages (e.g., database(s) 132, which may include accumulation data database(s) 134, model database(s) 136, or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near-field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., that is substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 described herein is for illustrative purposes and is not intended to be limiting, because any of subsystems 112-118 may provide more or less functionality than is described. For example, one or more of subsystems 112-118 may be eliminated, and some or all of its or their functionality may be provided by other subsystems of subsystems 112-118. As another example, additional subsystems may be programmed to perform some or all of the functionality attributed herein to one of subsystems 112-118.

Although various embodiments of the present disclosure have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present disclosure contemplates that, to the extent possible, one or more features of any embodiment can be combined with one or more features of any other embodiment.

The present techniques may be better understood with reference to the following enumerated embodiments:

1. A method comprising: obtaining resource accumulation data for a resource source (e.g., indicating a time and a resource amount of a plurality of resource accumulation events at which resources were made available at the resource source); using a first machine learning model (e.g., configured and trained based on prior resource accumulation data for a plurality of resource sources) and the resource accumulation data to determine a request frequency (e.g., based on one or more predicted times at which a threshold amount of resources is available at the resource source); and performing one or more resource request operations with the resource source in accordance with the request frequency.

2. The method of the preceding embodiment, wherein the resource accumulation data indicates an originating entity (e.g., an entity from which the resources made available at the resource accumulation events originate).

3. The method of any of the preceding embodiments, wherein the request frequency is determined based on characteristics associated with an originating entity indicated by the resource accumulation data (e.g., a wealth or excess amount of resources of the originating entity, historical behavior and event cancellations by the originating entity, etc.).

4. The method of the preceding embodiment, wherein the resource accumulation data for the resource source is obtained based on using a second machine learning model to extract the resource accumulation data from text-based data (e.g., the second machine learning model implementing operations related to optical character recognition techniques, natural language processing techniques, etc.).

5. The method of any of the preceding embodiments, wherein the first machine learning model is identified based on the first machine learning model being associated with the resource source and/or an entity associated with the resource source (e.g., a user associated with an asset account).

6. The method of any of the preceding embodiments, wherein the first machine learning model is trained to identify inconsistencies in the resource accumulation data (e.g., with respect to time between the resource accumulation events, with respect to resource amount of the resource accumulation events, etc.).

7. The method of any of the preceding embodiments, wherein the first machine learning model is configured to generate predictions for one or more subsequent resource accumulation events, the request frequency being determined from the generated predictions.

8. The method of any of the preceding embodiments, wherein the resource accumulation data is obtained based on receiving, via a network, the resource accumulation data from the originating entity (e.g., an entity from which the resources made available at the resource accumulation events originate).

9. The method of any of the preceding embodiments, wherein performing the one or more resource request operations comprises causing an amount of resources to be unavailable at the resource source (e.g., removing the resources from the resource source, withdrawing the resources from the resource source, occupying or being allocated resources from the resource source, receiving resources from the resource source, etc.).

10. The method of the preceding embodiment, wherein the first machine learning model is trained using prior accumulation for a plurality of resource sources that do not include the resource source.

11. A tangible, non-transitory, machine-readable medium storing instructions that, when executed by a data processing apparatus, cause the data processing apparatus to perform operations comprising those of any of the foregoing method embodiments.

12. A system comprising: one or more processors; and memory storing instructions that, when executed by the processors, cause the processors to effectuate operations comprising those of any of the foregoing method embodiments.

What is claimed is:

1. A system for reducing computing resource request errors resulting from insufficient computing resources to respond to incoming requests, the system comprising:

memory storing computer program instructions; and one or more processors configured to execute the computer program instructions to effectuate operations comprising:

transmitting, at a first frequency, a first request of a request type to a pool of computing resources, wherein the request type indicates a requested amount of computing resources and a requested resource type;

receiving, from the pool of computing resources, a notification that an available amount of computing resources associated with the pool of computing resources is less than the requested amount of computing resources, as a first remedial processing;

extracting, using a first machine learning model, resource accumulation data for the pool of computing resources, wherein the resource accumulation data indicates a time that each accumulation event of a plurality of accumulation events occurred and an accumulated amount of computing resources associated with each accumulation event of the plurality of accumulation events, wherein computing resources were made available at the pool of computing resources during the plurality of accumulation events;

identifying a second machine learning model and a third machine learning model based on prior resource accumulation data for a plurality of pools of computing resources;

selecting the second machine learning model from the second machine learning model and the third machine learning model based on the pool of computing resources being one of the plurality of pools of computing resources associated with the second machine learning model;

inputting, to the second machine learning model, the resource accumulation data to obtain predicted times that at least a threshold amount of computing resources will be available from the pool of computing resources;

determining a second frequency based on the request type and the predicted times, wherein the second frequency increases a likelihood that the pool of computing resources includes at least the threshold amount of computing resources available responsive to being requested;

generating, based on an automated adjustment of a current request frequency from the first frequency to the second frequency, a second request of the request type to be provided to the pool of computing resources at the second frequency;

transmitting, at the second frequency, the second request to the pool of computing resources;

preventing an error message from being generated and output based on the second request being submitted to the pool of computing resources and the pool of computing resources including at least the threshold amount of computing resources available to process the second request; and performing a resource request operation to receive the requested amount of resources based on the second request in accordance with the second frequency.

2. The system of claim 1, wherein extracting the resource accumulation data comprises extracting, using the first machine learning model, the resource accumulation data from text-based data for the pool of computing resources.

3. The system of claim 1, wherein the resource accumulation data for the pool of computing resources indicates a client device at which computing resources were in use before being made available to the pool of computing resources at the plurality of accumulation events, determining the second frequency comprises:

providing an indication of the client device to the second machine learning model;

obtaining the predicted times based on the indication of the client device as output from the second machine learning model; and determining the second frequency based on the predicted times.

4. A method comprising:

transmitting, at a first frequency, a first request of a request type to a pool of computing resources for a requested amount of computing resources and a requested resource type;

receiving, from the pool of computing resources, a notification that an available amount of computing resources associated with the pool of computing resources is less than the requested amount;

extracting, using a first machine learning model, resource accumulation data for the pool of computing resources that indicates, for each accumulation event of a plurality of accumulation events, a time and an amount of computing resources associated with each accumulation event of the plurality of accumulation events, wherein computing resources were made available at the pool of computing resources during the plurality of accumulation events;

identifying a second machine learning model and a third machine learning model based on prior resource accumulation data for a plurality of pools of computing resources;

selecting the second machine learning model from the second machine learning model and the third machine learning model based on the pool of computing resources being associated with the second machine learning model;

inputting the resource accumulation data to the second machine learning model to obtain predicted times that at least a threshold amount of computing resources will be available from the pool of computing resources and to determine a second frequency for a resource request based on at least a request type and the predicted times that increases a likelihood that the pool of computing resources includes at least the threshold amount of computing resources available responsive to being requested;

generating a second request of the request type and transmitting the second request to the pool of computing resources at the second frequency;

preventing an error message from being output based on the second request being submitted to the pool of computing resources at the second frequency and the pool of computing resources including at least the threshold amount of computing resources available to process the second request; and performing a resource request operation to receive the requested amount of resources based on the second request in accordance with the second frequency.

5. The method of claim 4, further comprising:

training the second machine learning model, wherein training comprises:

identifying that a time spanning between each of the plurality of accumulation events is inconsistent; and obtaining the predicted times at which a threshold amount of resources is available at the pool of computing resources based on the time spanning between each of the plurality of accumulation events.

6. The method of claim 4, further comprising:

training the second machine learning model, wherein training comprises:

identifying that accumulated amounts of respective accumulation events of the plurality of accumulation events are inconsistent with one another; and obtaining predicted times at which a threshold amount of resources is predicted to be available at the pool of computing resources based on the accumulated amounts of the respective accumulation events being inconsistent with one another.

7. The method of claim 4, wherein the resource accumulation data for the pool of computing resources indicates an entity from which the computing resources made available at the pool of computing resources originate, and wherein using the second machine learning model to determine the second frequency for the resource request comprises:

providing an indication of the entity to the second machine learning model;

obtaining the predicted times as an output from the second machine learning model based on the indication of the entity; and determining the second frequency based on the predicted times.

8. The method of claim 7, wherein extracting the resource accumulation data comprises receiving, via a network, the resource accumulation data from a client device of the entity.

9. The method of claim 4, wherein extracting the resource accumulation data comprises extracting, using the first machine learning model, the resource accumulation data from text-based data for the pool of computing resources.

10. The method of claim 4, further comprising:

causing, based on the second request, at least the threshold amount of resources to be unavailable at the pool of computing resources.

11. The method of claim 4, wherein the second machine learning model is trained based on prior resource accumulation data for a plurality of pools of computing resources that does not include the pool of computing resources.

12. One or more non-transitory computer-readable media comprising instructions that, when executed by one or more processors, cause operations comprising:

transmitting, at a first frequency, a first request of a request type to a pool of computing resources, wherein the request type indicates a requested amount of computing resources and a requested resource type;

receiving, from the pool of computing resources, a notification that an available amount of computing resources associated with the pool of computing resources is less than the requested amount;

extracting, using a first machine learning model, resource accumulation data for the pool of computing resources that indicates a time a plurality of accumulation events occurred and an accumulated amount of computing resources associated with the plurality of accumulation events, wherein computing resources were made available at the pool of computing resources during the plurality of accumulation events;

selecting a second machine learning model and a third machine learning model based on prior resource accumulation data for a plurality of pools of computing resources;

selecting the second machine learning model from the second machine learning model and the third machine learning model based on the pool of computing resources being one of the plurality of pools of computing resources associated with the second machine learning model;

obtaining, based on the resource accumulation data being input to the second machine learning model, predicted times that at least a threshold amount of computing resources will be available from the pool of computing resources;

determining a second frequency for a resource request based on the request type and the predicted times, wherein the second frequency increases a likelihood that the pool of computing resources includes at least the threshold amount of computing resources available responsive to being requested;

generating a second request of the request type to be provided to the pool of computing resources to be transmitted at the second frequency;

transmitting, at the second frequency, the second request to the pool of computing resources;

preventing an error message from being output based on the second request being submitted to the pool of computing resources at the second frequency and the pool of computing resources including at least the threshold amount of computing resources available to process the second request; and performing a resource request operation to receive the requested amount of resources in accordance with the second frequency based on the request type and the predicted times obtained by the second machine learning model.

13. The one or more non-transitory computer-readable media of claim 12, wherein the resource accumulation data being input to the second machine learning model to obtain the predicted times comprises:

identifying that an amount of time between each of the plurality of accumulation events is inconsistent; and obtaining the predicted times that at least a threshold amount of resources is predicted to be available at the pool of computing resources based on the amount of time between each of the plurality of accumulation events.

14. The one or more non-transitory computer-readable media of claim 12, wherein the resource accumulation data being input to the second machine learning model to obtain the predicted times comprises:

identifying that accumulated amounts of respective events of the plurality of accumulation events are inconsistent with one another; and obtaining the predicted times that at least a threshold amount of resources is predicted to be available at the pool of computing resources based on the accumulated amounts of the respective events being inconsistent with one another.

15. The one or more non-transitory computer-readable media of claim 12, wherein the resource accumulation data for the pool of computing resources indicates an entity from which the computing resources made available at the pool of computing resources originate, and wherein the predicted times that at least the threshold amount of resources is predicted to be available at the pool of computing resources is based on the entity.

16. The one or more non-transitory computer-readable media of claim 15, wherein extracting the resource accumulation data comprises receiving the resource accumulation data from the entity.

17. The one or more non-transitory computer-readable media of claim 12, further comprising:
   causing, based on performing the second request, at least a threshold amount of resources to be unavailable at the pool of computing resources.

18. The one or more non-transitory computer-readable media of claim 12, wherein the second machine learning model is trained based on prior resource accumulation data for a plurality of pools of computing resources that does not include the pool of computing resources.

* * * * *